(12) United States Patent
Takamoto et al.

(10) Patent No.: US 10,441,995 B2
(45) Date of Patent: *Oct. 15, 2019

(54) METHOD FOR PRODUCING FORGED CRANKSHAFT

(71) Applicant: NIPPON STEEL & SUMITOMO METAL CORPORATION, Tokyo (JP)

(72) Inventors: Sho Takamoto, Osaka (JP); Kenji Tamura, Takatsuki (JP); Tomohisa Yamashita, Suita (JP); Kunihiro Yabuno, Matsubara (JP); Ken Yoshino, Guangdong (CN); Hiroyuki Kurokawa, Nishinomiya (JP); Junichi Okubo, Amagasaki (JP); Koichiro Ishihara, Kyoto (JP)

(73) Assignee: NIPPON STEEL CORPORATION, Tokyo (JP)

( * ) Notice: Subject to any disclaimer, the term of this patent is extended or adjusted under 35 U.S.C. 154(b) by 142 days.

This patent is subject to a terminal disclaimer.

(21) Appl. No.: 15/560,504

(22) PCT Filed: Mar. 31, 2016

(86) PCT No.: PCT/JP2016/060705
§ 371 (c)(1),
(2) Date: Sep. 22, 2017

(87) PCT Pub. No.: WO2016/159253
PCT Pub. Date: Oct. 6, 2016

(65) Prior Publication Data
US 2018/0056372 A1    Mar. 1, 2018

(30) Foreign Application Priority Data

Apr. 3, 2015 (JP) .................................. 2015-076766
Dec. 15, 2015 (JP) .................................. 2015-243893

(51) Int. Cl.
*B21K 1/08* (2006.01)
*B23P 15/00* (2006.01)
(Continued)

(52) U.S. Cl.
CPC ................. *B21K 1/08* (2013.01); *B21J 5/027* (2013.01); *B23P 15/00* (2013.01); *F16C 3/08* (2013.01); *B23P 2700/07* (2013.01)

(58) Field of Classification Search
CPC ...... B21K 1/08; F16C 3/08; F16C 3/06; B21J 5/027; B21J 5/08; B21J 9/06; B21J 9/08; B21J 9/12; B23P 15/00; B23P 2700/07
See application file for complete search history.

(56) References Cited

U.S. PATENT DOCUMENTS

| 4,015,485 A | 4/1977 | Ganter-Ullmann et al. |
| 4,811,585 A * | 3/1989 | Takahashi ................. B21H 1/18 29/6.01 |
| 2015/0321245 A1* | 11/2015 | Tahira ...................... B21K 1/08 74/595 |

FOREIGN PATENT DOCUMENTS

| CN | 202338560 | 7/2012 |
| CN | 107000034 | 8/2017 |

(Continued)

*Primary Examiner* — Jun S Yoo
(74) *Attorney, Agent, or Firm* — Clark & Brody

(57) ABSTRACT

The disclosed production method includes a die forging step of obtaining a forged blank with flash having a crankshaft shape, and a trimming step of removing the flash from the forged blank while nipping the forged blank with a pair of holding dies. In the forged blank, at least one of the rough crank arms have, in a region near an adjacent rough pin, a first excess portion protruding from an outer periphery of a side portion of the rough crank arm. When the forged blank is nipped with the pair of holding dies, the first excess portion is deformed by the pair of holding dies to bulge toward an adjacent rough journal.

18 Claims, 11 Drawing Sheets

(51) Int. Cl.
*B21J 5/02* (2006.01)
*F16C 3/08* (2006.01)

(56) References Cited

FOREIGN PATENT DOCUMENTS

| | | |
|---|---|---|
| EP | 3 231 530 | 10/2017 |
| JP | 2007-071227 | 3/2007 |
| JP | 2010-230027 | 10/2010 |
| JP | 2012-007726 | 1/2012 |
| JP | 2014-040856 | 3/2014 |

* cited by examiner

IVD-IVD

VC-VC

VIB-VIB

VIIB-VIIB

METHOD FOR PRODUCING FORGED CRANKSHAFT

TECHNICAL FIELD

The present invention relates to a method for producing a crankshaft by hot forging.

BACKGROUND ART

A reciprocating engine to be employed in a motor vehicle, a motorcycle, an agricultural machine, a marine vessel or the like requires a crankshaft to extract power by converting reciprocating motions of pistons to rotational motion. There are two types of crankshafts: the type manufactured by die forging and the type manufactured by casting. Especially when high strength and high stiffness are required, forged crankshafts manufactured by die forging are often employed.

A forged crankshaft is generally produced by using a billet as a starting material. The billet is circular or square in cross section, and the cross-sectional area is constant throughout the length. A method for producing a forged crankshaft includes a preforming step, a die forging step, and a trimming step that are to be executed in this order. After the trimming step, a coining step may be executed if needed. Typically, the preforming step includes a rolling step and a bending step, and the die forging step includes a rough forging step and a finish forging step.

FIGS. 1A to 1F are schematic diagrams showing a conventional method for producing a common forged crankshaft. A crankshaft 1 shown in FIG. 1F is a four-cylinder eight-counterweight crankshaft to be mounted in a four-cylinder engine. The crankshaft 1 includes five journals J1 to J5, four pins P1 to P4, a front part Fr, a flange Fl, and eight crank arms (hereinafter referred to simply as "arms") A1 to A8. The eight arms A1 to A8 connect the journals J1 to J5 respectively to the pins P1 to P4. All of the eight arms A1 to A8 have counterweights (hereinafter referred to simply as "weights") W1 to W8, which are integrated with the arms A1 to A8, respectively.

In the following paragraphs, when the journals J1 to J5, the pins P1 to P4, the arms A1 to A8, and the weights W1 to W8 are each collectively referred to, a reference character "J" is used for the journals, a reference character "P" for the pins, a reference character "A" for the arms, and a reference character "W" for the weights.

In the production method shown in FIGS. 1A to 1F, the forged crankshaft 1 is produced as follows. First, a billet 2 with a specified length as shown in FIG. 1A is heated in a heating furnace (for example, an induction heating furnace, a gas atmosphere heating furnace or the like), and the heated billet undergoes a rolling step. In the rolling step, the billet 2 is rolled and reduced, for example, by grooved rolls. This is to distribute the volume of the billet 2 in the axial direction, and thereby, a rolled blank 3, which is an in-process material, is obtained (see FIG. 1B). Next, in a bending step, the rolled blank 3 is partly reduced from a direction perpendicular to the length direction. This is to distribute the volume of the rolled blank 3, and thereby, a bent blank 4, which is a next in-process material, is obtained (see FIG. 1C).

Next, in a rough forging step, the bent blank 4 is reduced by a pair of an upper die and a lower die, and thereby, a rough forged blank 5 is obtained (see FIG. 1D). The rough forged blank 5 is roughly in the shape of a crankshaft (finished product). In a finish forging step, the rough forged blank 5 is reduced by a pair of an upper die and a lower die, and thereby, a finish forged blank 6 is obtained (see FIG. 1E). The finish forged blank 6 has a shape in agreement with the shape of the finished crankshaft. During the rough forging and the finish forging, excess material flows out through a space between the mutually facing parting faces of the dies, which results in formation of flash. Accordingly, the rough forged blank 5 and the finish forged blank 6 have great flash B on the periphery.

In a trimming step, for example, while the finish forged blank 6 is nipped and held by a pair of dies, the finish forged blank 6 is punched by a cutting die. Thereby, the flash B is removed from the finish forged blank 6, and a forged blank with no flash is obtained. The forged blank with no flash has substantially the same shape as the forged crankshaft 1 shown in FIG. 1F.

In a coining step, main parts of the forged blank with no flash are slightly pressed by dies from above and below so that the forged blank with no flash can have the exact size and shape of the finished product. The main parts of the forged blank with no flash are, for example, shaft parts such as the journals J, the pins P, the front part Fr, the flange Fl and the like, and further, the arms A and the weights W. In this way, the forged crankshaft 1 is produced.

The production method shown in FIGS. 1A to 1F is applicable not only to production of a four-cylinder eight-counterweight crankshaft as shown in FIG. 1F but also to production of any other crankshaft. For example, the production method is applicable to a four-cylinder four-counterweight crankshaft.

In a four-cylinder four-counterweight crankshaft, only some of the eight arms A1 to A8 incorporate a weight W. For example, the front first arm A1, the rearmost eighth arm A8 and the central two arms (the fourth arm A4 and the fifth arm A5) incorporate a weight W. The other arms, namely, the second, the third, the sixth and the seventh arms A2, A3, A6 and A7 do not have a weight. Such arms without a weight will hereinafter referred to as "unweighted arms". These unweighted arms are oval.

Other crankshafts, for example, crankshafts to be mounted in three-cylinder engines, in-line six-cylinder engines, V-type six-cylinder engines, eight-cylinder engines and others can be produced by the same production method. It is noted that, when adjustment of the placement angles of the pins is necessary, a twisting step is added after the trimming step.

In recent years, there has been a need for weight reduction of reciprocating engines, particularly those for motor vehicles, in order to improve the fuel economy. Accordingly, there is also an ever-increasing demand for weight reduction of crankshafts to be mounted in reciprocating engines. Techniques to reduce the weight of a crankshaft are disclosed in Japanese Patent Application Publication No. 2012-7726 (Patent Literature 1) and Japanese Patent Application Publication No. 2010-230027 (Patent Literature 2).

Patent Literatures 1 and 2 teach an arm having a hole made in the journal-facing surface and teach a method for producing a crankshaft with the arm. The hole of the arm is made to lie on a straight line connecting the axis of the journal and the axis of the pin (which will be hereinafter referred to as an "arm centerline"), and the hole extends large and deep toward the pin. This arm is reduced in weight by the weight corresponding to the volume of the hole. The weight reduction of the arm leads to a weight reduction of the weight paired with the arm, thereby resulting in a reduction in weight of the whole forged crankshaft. Regarding the arm having a hole, in a region near the pin, both side portions across the arm centerline are thick, which ensures stiffness (torsional stiffness and bending stiffness).

Forming a recessed portion in the journal-facing surface of the arm while keeping both side portions of the arm thick as described above leads to weight reduction and ensuring of stiffness.

It is, however, difficult to produce such a forged crankshaft with such uniquely shaped arms by a conventional production method. The reason is as follows. When a recess is to be formed in the surface of an arm in the die forging step, the draft of the die will become a reverse draft at the site of the recess, and therefore, the forged blank will not be able to be removed from the die.

To avoid such situations, in the production methods disclosed in Patent Literatures 1 and 2, the following process is carried out. In the die forging step, the arm is shaped to be small with no recess formed in the surface of the arm, and after the trimming step, a punch is pushed into the surface of the arm so that the imprint made by the punch forms a recess.

In the crankshaft shown in FIG. 1F, all of the arms A and the weights W integrated therewith have the same shape. Practically, however, the arms A and the weights W integrated therewith may be different from one another in shape as needed. Japanese Patent Application Publication No. 2007-71227 (Patent Literature 3) and Japanese Patent Application Publication No. 2014-40856 (Patent Literature 4) disclose techniques for this.

Patent Literature 3 discloses a four-cylinder eight-counterweight crankshaft including a flywheel disposed at an end. In the crankshaft, the arms incorporating a weight are different from one another in the thickness and the center of gravity of the arm and in the mass of the weight. Accordingly, it is possible to reduce the thicknesses of the arms that need to have only low stiffness while ensuring the minimum necessary stiffness to each of the arms, thereby resulting in a reduction in weight.

Patent Literature 4 discloses a crankshaft for a multicylinder engine, the crankshaft including a flywheel disposed at an end. In the crankshaft, an arm that is less distant from the flywheel has higher bending stiffness and higher torsional stiffness than an arm that is more distant from the flywheel. Also, it is preferred that the arms are different from one another in the bending stiffness and in the torsional stiffness. Accordingly, it is possible to attain a reduction in weight while suppressing flexural vibration and torsional vibration.

In a case where the arms incorporating a weight have different arm shapes and different weight shapes, what portion of the arm needs to have high stiffness differs from arm to arm, depending on the shape. Specifically, an arm may need to have high stiffness in the region near the pin, while another arm may need to have high stiffness in the region near the journal.

CITATION LIST

Patent Literature

Patent Literature 1: Japanese Patent Application Publication No. 2012-7726
Patent Literature 2: Japanese Patent Application Publication No. 2010-230027
Patent Literature 3: Japanese Patent Application Publication No. 2007-71227
Patent Literature 4: Japanese Patent Application Publication No. 2014-40856

SUMMARY OF INVENTION

Technical Problems

The production methods disclosed in Patent Literatures 1 and 2 make it possible to make a hole in the journal-facing surface of an arm while keeping both side portions of the arm thick. Accordingly, the production methods allow production of a forged crankshaft with a reduced weight and assured stiffness.

In the production methods, however, in making a hole, the surface of an arm is strongly punched and is deformed entirely, and a great force is necessary for the punching. Therefore, a special facility including a die for supplying a great force to a punch is required, and it is also necessary to give attention to the durability of the punch.

It is an object of the present invention to provide a method for producing a forged crankshaft with both a reduced weight and assured stiffness by a simple process.

Solution to Problems

A production method according to an embodiment of the present invention is a method for producing a forged crankshaft including journals serving as a center of rotation, pins decentered from the journals, and crank arms connecting the journals and the pins. The forged crankshaft further includes counterweights integrated with all or some of the crank arms. The method includes a die forging step of obtaining a forged blank with flash having a crankshaft shape, and a trimming step of removing the flash from the forged blank while nipping the forged blank with a pair of holding dies. The forged blank includes rough journals, rough pins, rough crank arms, and rough counterweights, which correspond to the journals, the pins, the crank arms, and the counterweights of the forged crankshaft, respectively. At least one of the rough crank arms has, in a region near an adjacent one of the rough pins, a first excess portion protruding from an outer periphery of a side portion of the rough crank arm. When the forged blank is nipped with the pair of holding dies in the trimming step, the first excess portion is deformed by the pair of holding dies to bulge toward an adjacent one of the rough journals.

Advantageous Effects of Invention

In the forged crankshaft production method according to the present invention, all or some of the rough crank arms have, in a region near an adjacent one of the rough pins, at least one first excess portion protruding from an outer periphery of at least one side portion of the rough crank arm. When the forged blank is nipped with the pair of holding dies in the trimming step, the first excess portion is deformed by the pair of holding dies to bulge toward an adjacent one of the rough journals. This allows thickening of the side portions of the arm in the region near the adjacent rough pin and formation of a recess in the journal-facing surface of the arm. The forged crankshaft produced thereby has a reduced weight and assured stiffness. Also, since the excess portion is deformed by the pair of holding dies, the deformation can be carried out in a simple manner by use of an existing equipment.

DESCRIPTION OF EMBODIMENTS

An embodiment of the present invention will hereinafter be described. However, the present invention is not limited to the embodiment to be described below.

(Forged Crankshaft Production Method)

A production method according to the present invention is a method for producing a forged crankshaft. The forged crankshaft includes journals serving as a center of rotation, pins decentered from the journals, and crank arms connecting the journals to the pins. The forged crankshaft further includes counterweights integrated with all or some of the crank arms.

Figure 1A:
FIG. 1A is a schematic diagram of a billet during a conventional process of producing a common forged crankshaft.
Figure 1B:
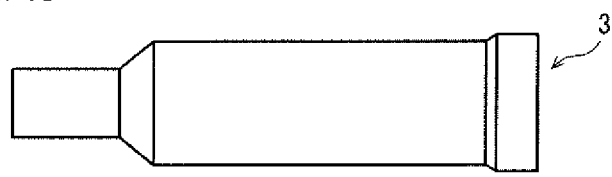
FIG. 1B is a schematic diagram of a rolled blank during the conventional process of producing a common forged crankshaft.
Figure 1C:
FIG. 1C is a schematic diagram of a bent blank during the conventional process of producing a common forged crankshaft.
Figure 1D:
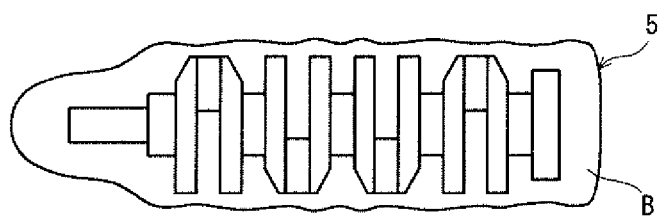
FIG. 1D is a schematic diagram of a rough forged blank during the conventional process of producing a common forged crankshaft.
Figure 1E:
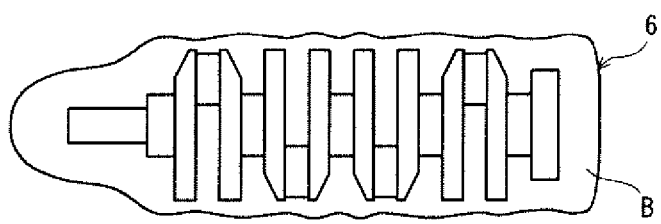
FIG. 1E is a schematic diagram of a finish forged blank during the conventional process of producing a common forged crankshaft.
Figure 1F:
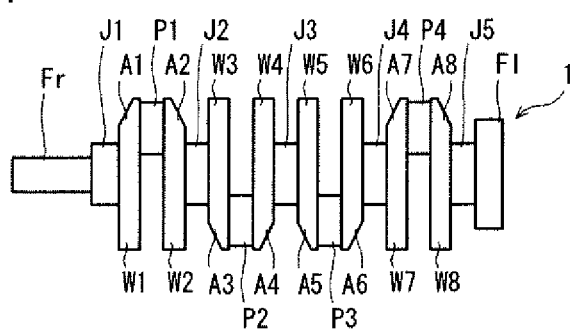
FIG. 1F is a schematic diagram of a crankshaft during the conventional process of producing a common forged crankshaft.

The production method according to the present invention includes a die forging step and a trimming step to be executed in this order. The die forging step is to obtain a forged blank with flash having a crankshaft shape. The forged blank has roughly the same shape as the crankshaft. The forged blank includes rough journals, rough pins, rough crank arms and rough counterweights corresponding to the journals, the pins, the crank arms and the counterweights of the forged crankshaft, respectively. The forged blank further includes flash and first excess portions which will be described later. There is no limit to the die forging step, and the die forging step may include a rough forging step and a finish forging step as described above with reference to FIGS. 1D and 1E.

In the trimming step, while the forged blank is nipped and held by a pair of holding dies, the flash is removed from the forged blank. At least one of the rough crank arms has, in a region near the adjacent rough pin, a first excess portion protruding from the outer periphery of at least one of the two side portions. In short, at least one of the rough crank arms has a first excess portion. In the trimming step, when the forged blank is nipped with the pair of holding dies, the first excess portion is deformed by the holding dies to bulge toward the adjacent rough journal.

All of the rough crank arms may include a first excess portion. Alternatively, all or some of the rough crank arms incorporating a rough counterweight may include a first excess portion. Also, only the rough crank arms incorporating a rough counterweight may include a first excess portion. Also, all or some of the crank arms not incorporating a rough counterweight may include a first excess portion. Also, only the crank arms not incorporating a rough counterweight may include a first excess portion.

At least one of the rough crank arms has, in the region near the adjacent rough pin, two first excess portions protruding respectively from the outer peripheries of the two side portions of the crank arm. This structure ensures stiffness of both side portions of the crank arm in the region near the adjacent pin. Between the two first excess portions, an area As (area with a recess) is present. The surface of the recess may be convex and bulge in the center with respect to the width direction as will be described later.

In the trimming step, the first excess portion may be deformed to bulge toward the rough journal while a holder is holding the lower surface of the flash. Since the first excess portion is deformed by the pair of holding dies, at the initial stage of the trimming step, the shape of the first excess portion does not fit in the shape of the pair of holding dies. Therefore, if the forged blank having a first excess portion before being deformed is held by only the lower holding die, the forged blank will be in an unstable posture. This problem is noticeable especially when only some of the rough crank arms have the first excess portion. By using the holder, it is possible to apply trimming to the forged blank while keeping the forged blank in a stable posture. Specifically, trimming can be performed with the flash of the forged blank kept in a horizontal posture. Further, the forged blank may be kept in the center between the upper die and the lower die by the holder.

The holder may move to keep holding the lower surface of the flash along with movements of the holding dies. The flash may move up and down along with movements of the holding dies. In this case, it is preferred that the holder moves (up and down) following the flash.

The edge of the holder (the edge to contact the lower surface of the flash) may have a shape that fits in the edge of the cutting die to remove the flash. For example, the edge of the holder may have a shape corresponding to the parting line of the finished product. The lower surface of the flash may be held by a plurality of holders. For example, three or more (for example, four or more) holders may be used. Using four or more holders allows the rough forged blank to be kept in a more stable posture. When the holders hold the lower surface of the flash at a plurality of points, the holders preferably hold the portions that are great in mass (for example, the portions around the rough counterweights). The plurality of holders may be located on different levels such that the forged blank at the start of trimming is in a stable posture. For example, in producing a three-cylinder or six-cylinder crankshaft, the flash may not be formed on a level. In this case, the holders shall be placed on levels as appropriate according to the respective levels where the portions are to be kept.

The holders are moved to and kept in proper positions to serve the above function. There is no limit as to the mechanism for moving and keeping the holders, and any conventional mechanism can be used. For example, a hydraulic cylinder, a motor, an elastic member (spring) or the like can be used to move and keep the holders. The holders may be moved and kept by a conventional mechanism used for a blank holder.

In the trimming step, the deformation of the first excess portion may be carried out by crushing or bending.

At least one of the rough crank arms may have, in a region near the adjacent rough journal, a second excess portion protruding from the outer periphery of a side portions. In this case, in the trimming step, when the forged blank is nipped with the pair of holding dies, the second excess portion is deformed by the holding dies to bulge toward the adjacent rough pin. All of the rough crank arms may include a second excess portion. Alternatively, all or some of the rough crank arms incorporating a rough counterweight may include a second excess portion. Also, only the rough crank arms incorporating a rough counterweight may include a second excess portion. Also, all or some of the crank arms not incorporating a rough counterweight may include a second excess portion. Also, only the crank arms not incorporating a rough counterweight may include a second excess portion.

At least one of the rough crank arms has, in the region near the adjacent rough journal, two second excess portions protruding respectively from the outer peripheries of the two side portions of the crank arm. This structure ensures stiffness of both side portions of the crank arm in the region near the adjacent journal. Between the two second excess portions, an area As (area with a recess), which will be described later, is present. The surface of the recess may be convex and bulge in the center with respect to the width direction as will be described later.

The rough crank arm having a second excess portion may be the rough crank arm incorporating a rough counterweight.

The rough crank arm having a second excess portion may be the rough crank arm not incorporating a rough counterweight.

In the trimming step, the deformation of the second excess portion may be carried out by crushing or bending.

In an aspect, the present invention provides an exemplary method for producing a forged crankshaft. The exemplary production method is intended to produce a forged crankshaft including journals serving as a center of rotation, pins decentered from the journals, and crank arms connecting the journals to the pins. In the forged crankshaft, all or some of the crank arms incorporate a counterweight. The exemplary production method includes a die forging step of obtaining a forged blank with flash having a crankshaft shape, the forged blank including a crank arm (rough crank arm) having, in a region near an adjacent pin (rough pin), first excess portions protruding respectively from outer peripheries of both side portions, and a trimming step of removing the flash from the forged blank while nipping the forged blank with a pair of holding dies. In the exemplary production method, in the trimming step, when the forged blank is nipped with the pair of holding dies, the first excess portions are deformed by the pair of holding dies, whereby both side portions of the crank arm (rough crank arm) in the region near the adjacent pin (rough pin) are thickened.

The above paragraph describes a case where the forged blank necessarily includes first excess portions. However, the production method according to the present invention is applicable to a case where the forged blank does not include any first excess portions but include at least one second excess portion. In this case, as mentioned above, in the trimming step, when the forged blank is nipped with the pair of holding dies, the second excess portion is deformed by the pair of holding dies to bulge toward the adjacent rough pin.

A forged crankshaft production method according an embodiment of the present invention will hereinafter be described with reference to the drawings. In the following paragraphs, descriptions of the matters already described with reference to FIGS. 1A to 1F may not be repeated.

1. Shape of Crankshaft

A forged crankshaft to be produced by a method according to the present embodiment includes journals serving as a center of rotation, pins decentered from the journals, and arms connecting the journals to the pins. The forged crankshaft further includes counterweights integrated with all or some of the crank arms.

In an aspect, the forged crankshaft to be produced by the method includes a number of units (which are also referred to as "slots") corresponding to the number of cylinders of the engine. One unit includes a pin, and two arms located to hold the pin therebetween. On both sides of one unit, two journals are located. Two adjacent units are connected to each other via a journal. In a crankshaft for a V-type six-cylinder engine, two pins and an arm therebetween define a small unit, and one small unit and two arms on both sides thereof define a large unit. Further, journals are located on both sides of the large unit.

The forged crankshaft production method according to the present embodiment is applicable to production of a four-cylinder eight-counterweight crankshaft and production of a four-cylinder four-counterweight crankshaft, for example. The forged crankshaft production method is applicable also to production of other types of crankshafts, such as crankshafts to be mounted in three-cylinder engines, in-line six-cylinder engines, V-type six-cylinder engines, eight-cylinder engines and others.

Figure 6A:
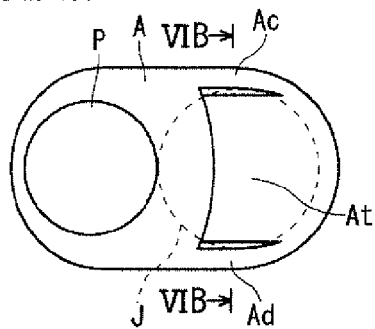
FIG. 6A is a diagram of an arm after trimming for a crankshaft having a third exemplary configuration according to the present invention, showing the pin-facing surface of the arm.
Figure 6B:
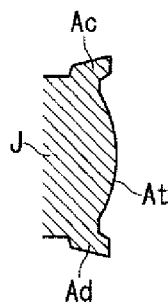
FIG. 6B is a sectional view along the line VIB-VIB in FIG. 6A.

More specifically, the forged crankshaft production method according to the present embodiment is applicable to production of a forged crankshaft having a first exemplary configuration as shown in FIGS. 2A to 2D, production of a forged crankshaft having a second exemplary configuration as shown in FIGS. 4A to 4D, and production of a forged crankshaft having a third exemplary configuration as shown in FIGS. 6A and 6B.

In either of the crankshafts having the first, the second and the third exemplary configurations, all of the arms, whether incorporating a weight or not, have a recess in the journal-facing surface. As will be described later, at least one of the arms may have a recess in the journal-facing surface. In the crankshaft having the second exemplary configuration, the arms incorporating a weight further have a recess in the pin-facing surface. The crankshaft having the third exemplary configuration includes arms incorporating no weight. In the crankshaft having the third exemplary configuration, the arms incorporating no weight have a recess in the pin-facing surface in addition to the recess in the journal-facing surface.

According to the present embodiment, in order to form recesses in the arms, the crankshaft production method includes a die forging step of obtaining a forged blank with flash, and a trimming step of removing the flash from the forged blank. The rough arms of the forged blank have first excess portions, and in the trimming step, the first excess portions are deformed to bulge toward the journals. The shapes of the arms of the forged crankshaft (finished product) and the rough arms of the forged blank will hereinafter be described.

Figure 2A:
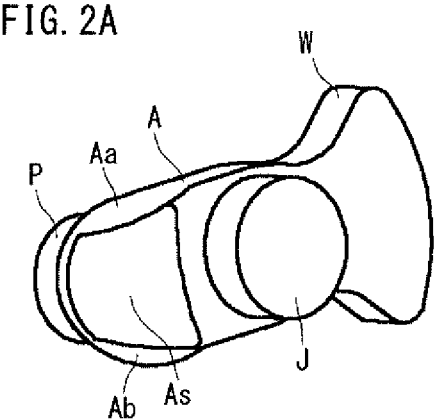
FIG. 2A is a perspective view of an arm after trimming for a crankshaft having a first exemplary configuration according to the present invention, schematically showing the journal-facing surface of the arm.
Figure 2B:
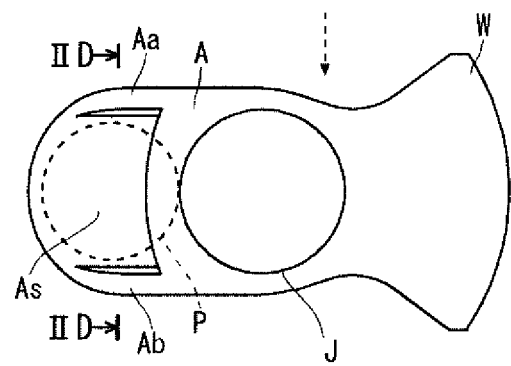
FIG. 2B is a diagram showing the journal-facing surface of the arm shown in FIG. 2A.
Figure 2C:
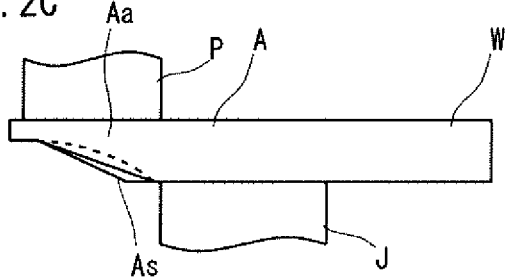
FIG. 2C is a diagram showing a side surface of the arm shown in FIG. 2A.
Figure 2D:
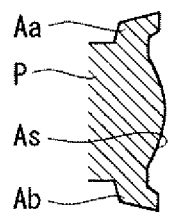
FIG. 2D is a sectional view along the line IID-IID in FIG. 2B.

FIGS. 2A to 2D are diagrams showing an arm after the trimming step for the crankshaft having the first exemplary configuration according to the present invention. FIG. 2A is a perspective view, FIG. 2B is a view showing the journal-facing surface, and FIG. 2C is a side view. FIG. 2D is a sectional view along the line IID-IID in FIG. 2B. FIGS. 2A to 2D show one of the arms (incorporating a weight) of the crankshaft. FIG. 2C is a view from the direction indicated by the dashed arrow in FIG. 2B.

As shown in FIGS. 2A to 2D, in the first exemplary configuration, each of the arms A has a recess in the journal(J)-facing surface, in a region near the adjacent pin P, in an area As inside of both side portions (two side portions) Aa and Ab. The side portions Aa and Ab in the region near the pin P bulge toward the journal J, and the thicknesses of the side portions (Aa, Ab) are greater than the thickness of the recess. The side portions mean surfaces and portions therearound at the edges of the arm A in the width direction (a direction perpendicular to the decentering direction of the pins), that is, the end portions of the arm A in the width direction. The area As is on the surface opposite to the pin P, that is, on the journal(J)-facing surface.

In the crankshaft having the first exemplary configuration, the side portions Aa and Ab of each arm A are kept as thick as an arm without a recess. In terms of results, a recess is formed in the journal(J)-facing surface of the arm A. Accordingly, the forged crankshaft having the first exemplary configuration can achieve a reduction of weight by the recesses formed in the arms A. Additionally, the maintained thicknesses of the side portions Aa and Ab of the arm A ensure stiffness. In other words, the greater thicknesses of the side portions Aa and Ab in the region near the adjacent pin P than the thickness of the recess ensure stiffness.

The sectional shape of the area As inside of the side portions Aa and Ab (the bottom shape of the recess) is preferably convex and bulges in the center with respect to the width direction as shown in FIG. 2D. In other words, it is preferred that the thickness of the area As gradually decreases with increasing distance from the center with respect to the width direction. Since the bottom shape of the recess is convex and bulges in the center with respect to the width direction, the bending stiffness can be improved. It is possible to form a recess with this bottom shape by making the sectional shape of the central portion with respect to the width direction arc-shaped, semi-elliptic or parabolic, for example.

Figure 3A:
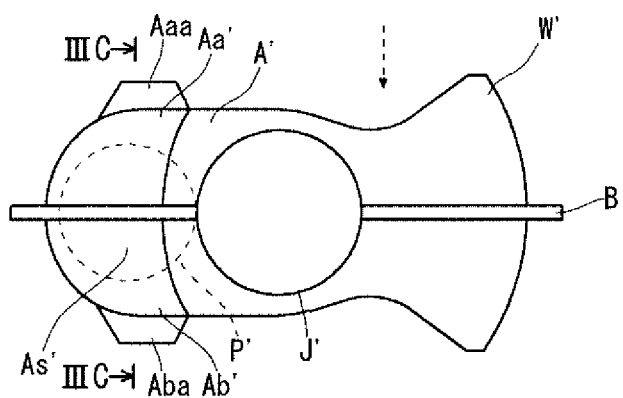
FIG. 3A is a diagram of a rough arm before trimming (of a forged blank with flash) for the crankshaft having the first exemplary configuration, showing the rough-journal-facing surface of the rough arm.
Figure 3B:
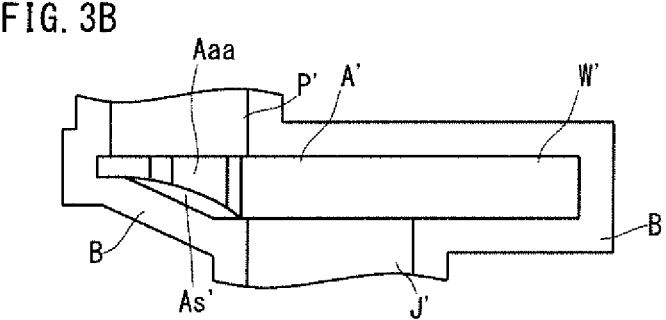
FIG. 3B is a diagram showing a side surface of the rough arm shown in FIG. 3A.
Figure 3C:
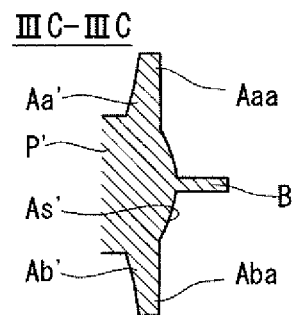
FIG. 3C is a sectional view along the line IIIC-IIIC in FIG. 3A.

FIGS. 3A to 3C are diagrams showing a rough arm before undergoing the trimming step (a rough arm of a forged blank with flash) for the crankshaft having the first exemplary configuration. FIG. 3A is a view showing the rough-journal-facing surface. FIG. 3B is a side view. FIG. 3C is a sectional view along the line IIIC-IIIC in FIG. 3A. FIGS. 3A to 3C show one of the rough arms (incorporating a rough weight W') for the crankshaft. FIG. 3B is a view from the direction indicated by the dashed arrow in FIG. 3A.

As shown in FIGS. 3A to 3C, each of the rough arms A' before the trimming step has a surface shape in agreement with the bottom shape of the recess after the trimming step, in the rough-journal(J')-facing surface, in a region near the adjacent rough pin P', in an area As' inside of the side portions Aa' and Ab'. The surface shape extends smoothly to the side portions Aa' and Ab' in the region near the rough pin P'. Accordingly, the thicknesses of the side portions Aa' and Ab' are smaller than those after the trimming step.

Each of the rough arm A' has, in the region near the adjacent rough pin P', first excess portions Aaa and Aba on the outer peripheries of the side portions Aa' and Ab'. The first excess portions Aaa and Aba protrude respectively from the outer peripheries of the side portions Aa' and Ab' in the region near the adjacent rough pin P'. The first excess portions Aaa and Aba are plate-shaped, and extend along the outer peripheries of the side portions Aa' and Ab' in the region near the adjacent rough pin P'. The thicknesses of the first excess portions Aaa and Aba are substantially equal to or smaller than the thicknesses of the bases thereof, that is, the side portions Aa' and Ab'.

Figure 4A:
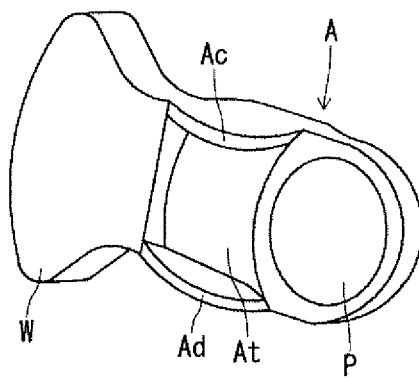
FIG. 4A is a perspective view of an arm after trimming for a crankshaft having the second exemplary configuration, showing the rough-journal-facing surface of the arm.
Figure 4B:
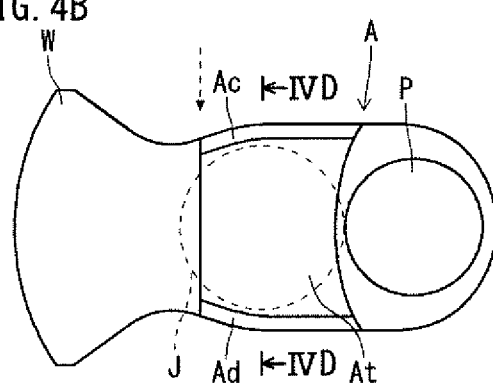
FIG. 4B is a diagram showing the pin-facing surface of the arm shown in FIG. 4A.
Figure 4C:
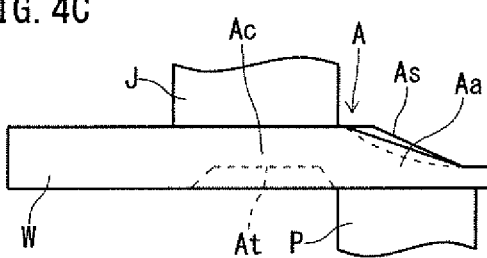
FIG. 4C is a diagram showing a side surface of the arm shown in FIG. 4A.
Figure 4D:
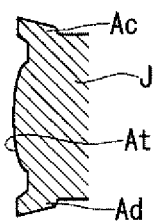
FIG. 4D is a sectional view along the line IVD-IVD in FIG. 4B.

FIGS. 4A to 4D are diagrams showing an arm after the trimming step for the crankshaft having the second exemplary configuration according to the present invention. FIG. 4A is a perspective view, FIG. 4B is a view showing the pin-facing surface, and FIG. 4C is a side view. FIG. 4D is a sectional view along the line IVD-IVD in FIG. 4B. FIGS. 4A to 4D show one of the arms (incorporating a weight) of the crankshaft. FIG. 4C is a view from the direction indicated by the dashed arrow in FIG. 4B.

In the second exemplary configuration, as in the first exemplary configuration, each of the arms A has thick side portions in a region near the adjacent pin P, and has a recess in the journal(J)-facing surface. Further, in the second exemplary configuration, each of the arms A incorporating a weight has a recess in the pin(P)-facing surface, in a region near the adjacent journal J, in an area At inside of both side portions (two side portions) Ac and Ad, as shown in FIGS. 4A to 4D. The side portions Ac and Ad in the region near the journal J bulge toward the adjacent pin P, and the thicknesses of the side portions Ac and Ad are greater than the thickness of the recess. The area At is on the surface opposite to the journal J.

In the crankshaft having the second exemplary configuration, regarding all the arms A, the side portions in the region near the adjacent pin P are thick, and a recess is formed in the journal(J)-facing surface. Regarding the arms A incorporating a weight, further, the side portions Ac and Ad in the region near the adjacent journal J are kept as thick as those of an arm A without a recess, and in terms of results, a recess is formed also in the pin(P)-facing surface.

Accordingly, the forged crankshaft having the second exemplary configuration can achieve a reduction of weight by the recesses formed in the respective journal(J)-facing surfaces of all the arms A and the recesses formed in the respective pin(P)-facing surfaces of the arms A incorporating a weight. Additionally, the maintained thicknesses of the side portions Aa and Ab in the region near the adjacent pin P and the side portions Ac and Ad in the region near the adjacent journal J ensure stiffness. In other words, the greater thicknesses of the side portions Aa and Ab in the region near the adjacent pin P and the greater thicknesses of the side portions Ac and Ad in the region near the adjacent journal J than the thicknesses of the recesses ensure stiffness.

Regarding the arms A incorporating a weight, the sectional shape of the area At inside of the side portions Ac and Ad (the bottom shape of the recess) is preferably convex and bulges in the center with respect to the width direction as shown in FIG. 4D. In other words, it is preferred that the thickness of the area At gradually decreases with increasing distance from the center with respect to the width direction. Since the bottom shape of the recess is convex and bulges in the center with respect to the width direction, the bending stiffness can be improved. It is possible to form a recess with this bottom shape by making the sectional shape of the central portion with respect to the width direction arc-shaped, semi-elliptic or parabolic, for example.

Figure 5A:
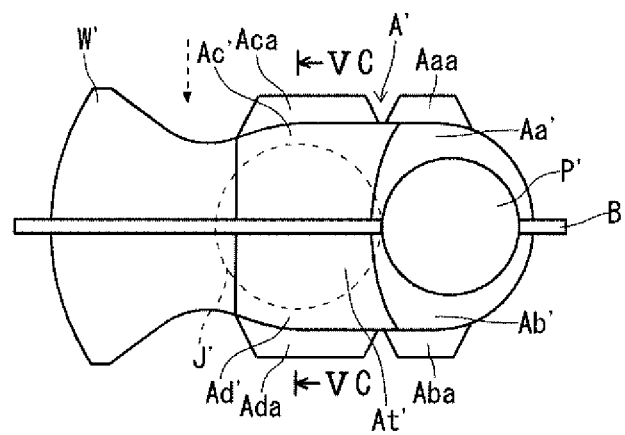
FIG. 5A is a diagram of a rough arm before trimming (of a forged blank with flash) for the crankshaft having the second exemplary configuration, showing the pin-facing surface of the rough arm.
Figure 5B:
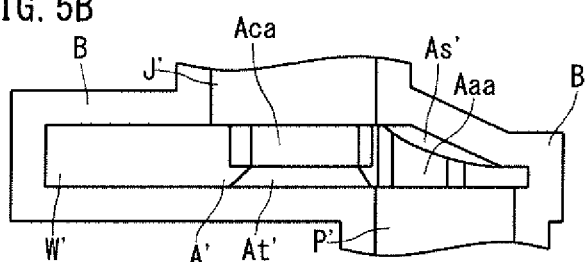
FIG. 5B is a diagram showing a side surface of the rough arm shown in FIG. 5A.
Figure 5C:
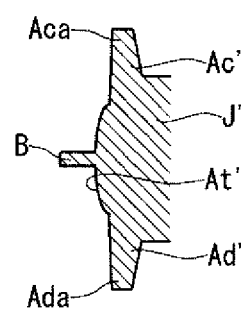
FIG. 5C is a sectional view along the line VC-VC in FIG. 5A.

FIGS. 5A to 5C are diagrams showing a rough arm before the trimming step (a rough arm of a forged blank with flash) for the crankshaft having the second exemplary configuration. FIG. 5A is a view showing the rough-pin-facing surface. FIG. 5B is a side view. FIG. 5C is a sectional view along the line VC-VC in FIG. 5A. FIGS. 5A to 5C show one of the rough arms (incorporating a rough weight) for the crankshaft. FIG. 5B is a view from the direction indicated by the dashed arrow in FIG. 5A.

In the second exemplary configuration, as in the first exemplary configuration, each of the rough arms A' before the trimming step has a surface shape in agreement with the bottom shape of the recess after the trimming step, in the rough-journal(J')-facing surface, in a region near the adjacent rough pin P', in an area As' inside of the side portions Aa' and Ab'. Also, as in the first exemplary configuration, each of the rough arms A' has, in the region near the adjacent rough pin P', first excess portions Aaa and Aba on the outer peripheries of the side portions Aa' and Ab'. The first excess portions Aaa and Aba protrude respectively from the outer peripheries of the side portions Aa' and Ab' in the region near the adjacent rough pin P'.

Additionally, each of the rough arms A' incorporating a rough weight has a surface shape in agreement with the bottom shape of the recess after the trimming step, in the rough-pin(P')-facing surface, in a region near the adjacent rough journal J', in an area At' inside of the side portions Ac' and Ad'. The surface shape extends smoothly to the side portions Ac' and Ad' in the region near the adjacent rough journal J'. Accordingly, the thicknesses of the side portions Ac' and Ad' are smaller than those after the trimming step.

Each of the rough arms A' incorporating a rough weight further has, in the region near the adjacent rough journal J', second excess portions Aca and Ada on the outer peripheries of the side portions Ac' and Ad'. The second excess portions Aca and Ada protrude respectively from the outer peripheries of the side portions Ac' and Ad' in the region near the adjacent rough journal J'. The second excess portions Aca and Ada shown in FIGS. 5A to 5C are plate-shaped, and extend along the outer peripheries of the side portions Ac' and Ad' in the region near the adjacent rough journal J'. The thicknesses of the second excess portions Aca and Ada are substantially equal to or smaller than the thicknesses of the bases thereof that is, the side portions Ac' and Ad'.

FIGS. 6A and 6B are diagrams showing an arm after the trimming step for the crankshaft having the third exemplary configuration according to the present invention. FIG. 6A is a view showing the pin-facing surface. FIG. 6B is a sectional view along the line VIB-VIB in FIG. 6A. The crankshaft having the third exemplary configuration includes a plurality of arms, and at least one of the arms incorporate a weight. FIGS. 6A and 6B show one of the arms not incorporating a weight, that is, one of the unweighted arms of the crankshaft.

In the third exemplary configuration, as in the first exemplary configuration, each of the arms, whether incorporating a weight or not, has thick side portions in a region near the adjacent pin P and has a recess in the journal-facing surface, though it is not shown in the drawings. In the third exemplary configuration, as shown in FIGS. 6A and 6B, each of the unweighted arms A further has a recess in the pin P-facing surface, in a region near the adjacent journal J, in an area At inside of side portions Ac and Ad. The side portions Ac and Ad in the region near the adjacent journal J bulge toward the adjacent pin P, and the thicknesses of the side portions Ac and Ad are greater than the thickness of the recess.

In the crankshaft having the third exemplary configuration, regarding all the arms A, the side portions Aa and Ab in the region near the adjacent pin P are thick, and a recess is formed in the journal J-facing surface. Regarding the unweighted arms A, further, the side portions Ac and Ad in the region near the adjacent journal J are kept as thick as those of an arm A without a recess. Also, in terms of results, each of the unweighted arms A obtains a recess in the pin P-facing surface.

Accordingly, the forged crankshaft having the third exemplary configuration can achieve a reduction of weight by the recesses formed in the respective journal J-facing surfaces of all the arms A and the recesses formed in the respective pin P-facing surfaces of the unweighted arms A. Additionally, the maintained thicknesses of the side portions Aa and Ab in the region near the adjacent pin P and the side portions Ac and Ad in the region near the adjacent journal J ensure stiffness. In other words, the greater thicknesses of the side portions Aa and Ab in the region near the adjacent pin P and the greater thicknesses of the side portions Ac and Ad in the region near the adjacent journal J than the thicknesses of the recesses ensure stiffness.

Regarding the unweighted arms A, the sectional shape of the area At inside of the side portions Ac and Ad (the bottom shape of the recess) is preferably convex and bulges in the center with respect to the width direction as shown in FIG. 6B. In other words, it is preferred that the thickness of the area At gradually decreases with increasing distance from the center with respect to the width direction. Since the bottom shape of the recess is convex and bulges in the center with respect to the width direction, the bending stiffness can be improved. It is possible to form a recess with this bottom shape by making the sectional shape of the central portion with respect to the width direction arc-shaped, semi-elliptic or parabolic, for example.

Figure 7A:
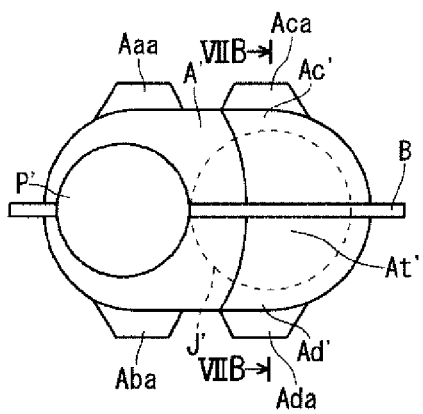
FIG. 7A is a diagram of a rough arm before trimming (of a forged blank with flash) for the crankshaft having the third exemplary configuration, showing the rough-pin-facing surface of the rough arm.
Figure 7B:
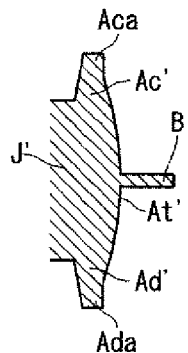
FIG. 7B is a sectional view along the line VIIB-VIIB in FIG. 7A.

FIGS. 7A and 7B are diagrams showing a rough arm before the trimming step (a rough arm of a forged blank with flash) for the crankshaft having the third exemplary configuration. FIG. 7A is a view showing the rough-pin-facing surface. FIG. 7B is a sectional view along the line VIIB-VIIB in FIG. 7A. FIGS. 7A to 7B show one of the rough unweighted arms of the forged blank.

In the third exemplary configuration, as in the first exemplary configuration, each of the rough arms A' before the trimming step, whether incorporating a rough weight or not, has a surface shape in agreement with the bottom shape of the recess after the trimming step, in the rough-journal(J')-facing surface, in a region near the adjacent rough pin P', in an area inside of the side portions, though it is not shown in the drawings. Also, as in the first exemplary configuration, each of the rough arms A' has, in the region near the adjacent rough pin P', first excess portions Aaa and Aba on the outer peripheries of the side portions. The first excess portions Aaa and Aba protrude respectively from the outer peripheries of the side portions in the region near the adjacent rough pin P'.

Additionally, each of the rough unweighted arms A' before the trimming step has a surface shape in agreement with the bottom shape of the recess after the trimming step, in the rough-pin(P')-facing surface, in a region near the adjacent rough journal J', in an area At' inside of the side portions Ac' and Ad'. The surface shape extends smoothly to the side portions Ac' and Ad' in the region near the adjacent rough journal J'. Accordingly, the thicknesses of the side portions Ac' and Ad' are smaller than those after the trimming step.

Each of the unweighted rough arms A' further has, in the region near the adjacent rough journal J', second excess portions Aca and Ada on the outer peripheries of the side portions Ac' and Ad'. The second excess portions Aca and Ada protrude respectively from the outer peripheries of the side portions Ac' and Ad' in the region near the adjacent rough journal J'. The second excess portions Aca and Ada are plate-shaped, and extend along the outer peripheries of the side portions Ac' and Ad' in the region near the adjacent rough journal J'. The thicknesses of the second excess portions Aca and Ada are substantially equal to or smaller than the thicknesses of the bases thereof, that is, the side portions Ac' and Ad'.

2. Production Process of Forged Crankshaft

A forged crankshaft production method according to the present embodiment includes a die forging step and a trimming step. Before the die forging step, for example, a preforming step may be executed. After the trimming step, for example, a coining step may be executed. When adjustment of placement angles of the pins is necessary, a twisting step is executed after the trimming step. These steps are to apply hot working and are to be executed sequentially. The forged crankshaft production method according to the present embodiment may employ a conventional production method in the parts other than the distinctive features of the present invention. For example, the production process according to the present invention may include at least one of the steps shown in FIGS. 1A to 1F or one or more steps adapted from those shown in FIG. 1A to 1F for the present invention as steps other than the distinctive features of the present invention.

The preforming step includes a rolling step and a bending step, for example. In the rolling step and the bending step, the volume of a billet (starting material) is distributed, whereby a bent blank is obtained.

The die forging step is to obtain a forged blank with flash as shown in FIGS. 3A to 3C. The obtained forged blank with flash is roughly in the shape of a crankshaft, and specifically, the forged blank with flash includes rough journals J', rough pins P', rough arms A' and others. Additionally, each of the rough arms A' of the forged blank with flash has, in a region near the adjacent rough pin P', first excess portions Aaa and Aba protruding from the outer peripheries of side portions Aa' and Ab'. Accordingly, in the die forging step, dies that permit formation of such excess portions (first excess portions or second excess portions, or first and second excess portions) are used for the die forging.

The die forging step to obtain such a forged blank with flash may include, for example, a rough forging step and a finish forging step.

In the die forging step, the draft never becomes a reverse draft. Specifically, the draft of the dies never becomes a reverse draft at any portions corresponding to the bottom surfaces of the recesses to be formed in the rough-journal (J')-facing surfaces of the rough arms (inner areas As') and at any portions corresponding to the first excess portions Aaa and Aba. In other words, the forged blank having the above-described shape can be produced by use of dies having no reverse draft. Therefore, the die forging, whether it is rough forging or finish forging, can be carried out with no trouble, and a forged blank with flash as shown in FIGS. 3A to 3C can be obtained. Also, in producing a forged blank with flash as shown in FIGS. 5A to 5C and in producing a forged blank with flash as shown in FIGS. 7A and 7B, the draft never becomes a reverse draft at any portions corresponding to the bottom surfaces of the recesses to be formed in the rough-journal(P)-facing surfaces of the rough arms A' (inner areas At') and at any portions corresponding to the second excess portions Aca and Ada. In other words, the forged blank having the above-described shape can be produced by use of dies having no reverse draft. Therefore, the die forging, whether it is rough forging or finish forging, can be carried out with no trouble.

In the trimming step, for example, while the forged blank with flash is nipped and held by a pair of holding dies, the flash is removed from the forged blank. Thereby, a forged blank with no flash is obtained. In the trimming step, when the forged blank is nipped with the pair of holding dies, the first excess portions are deformed by the pair of holding dies to bulge toward the rough journals. Thereby, the thicknesses of the side portions of the rough arms in the region near the rough pins are increased. The deformation of the first excess portions may be performed, for example, by crushing or bending. The details of the trimming step will be described later.

In the coining step, the forged blank with no flash obtained by the trimming step may be processed to have the exact size and shape of the finished product. When adjustment of the placement angles of the pins is necessary, the placement angles of the pins is adjusted in the twisting step.

3. Exemplary Process Flow of Trimming Step

Figure 8A:
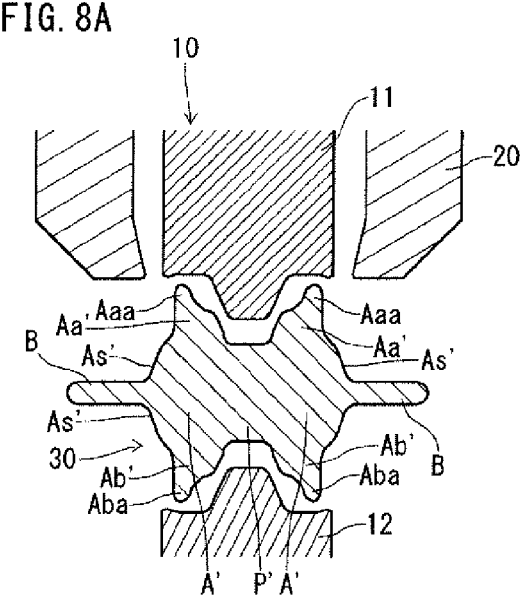
FIG. 8A is a sectional view showing the time when the forged blank has been placed in dies in an exemplary process flow of the trimming step according to the present invention.
Figure 8B:
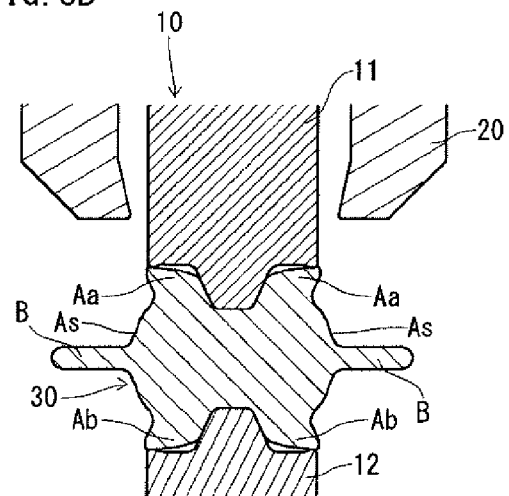
FIG. 8B is a sectional view showing a state where the forged blank is held by the dies in the exemplary process flow of the trimming step according to the present invention.
Figure 8C:
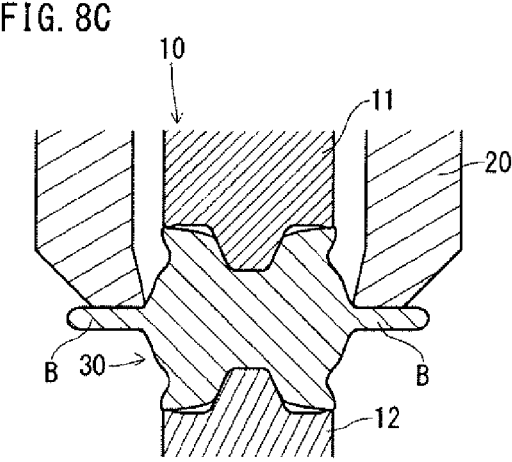
FIG. 8C is a sectional view showing the time when a cutting die has come into contact with the forged blank in the exemplary process flow of the trimming step according to the present invention.
Figure 8D:
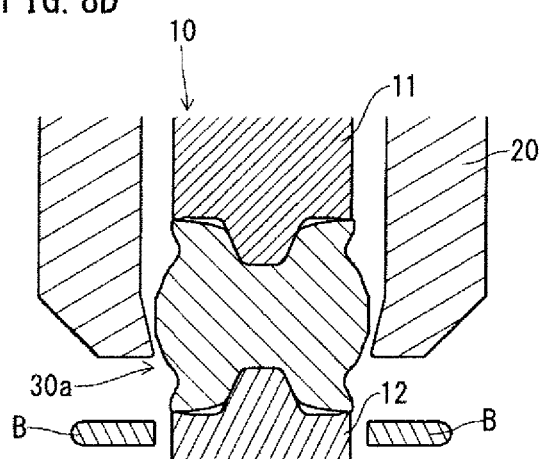
FIG. 8D is a sectional view showing the time when a downward movement of the cutting die has been completed in the exemplary process flow of the trimming step according to the present invention.

FIGS. 8A to 8D are sectional views showing an exemplary process flow of the trimming step of the crankshaft production method according to the present invention. FIG. 8A shows the time when the forged blank has been placed in a pair of dies. FIG. 8B shows a state where the forged blank is held by the pair of dies. FIG. 8C shows the time when a cutting die has come into contact with the forged blank. FIG. 8D shows the time when a downward movement of the cutting die has been completed. FIGS. 8A to 8D are sectional views at a position corresponding to the position indicated by the line IIIC-IIIC in FIG. 3A.

In FIGS. 8A to 8D, a forged blank 30, a pair of holding dies 10, and a cutting die 20 are shown. The shape of the forged blank 30 with flash is the same as the shape of the forged blank 30 with flash shown in FIGS. 3A to 3C. FIG. 8A shows one of the rough pins P' and two rough arms A' connected to the rough pin P', which are extracted from the forged blank 30.

The pair of holding dies 10 includes an upper die 11 and a lower die 12. The upper die 11 and the lower die 12 are movable to separate from each other and movable to come close to each other. While the forged blank 30 is positioned between the upper die 11 and the lower die 12, the upper die 11 and the lower die 12 are moved toward each other, and thereby, the forged blank 30 is nipped and held between the upper die 11 and the lower die 12.

The upper die 11 and the lower die 12 have impressions to nip and hold the forged blank 30 and to deform the protruding excess portions. The impressions reflect the shape of the finished crankshaft. The cutting die 20 has a proper shape for removal of flash B along the outline of the finished product. In other words, the edge of the cutting die 20 has a shape corresponding to the parting line of the finished product.

In the process flow using the pair of holding dies 10, first, the upper die 11 and the lower die 12 are separated from each other, and the cutting die 20 is moved up and retracted. In this state, as shown in FIG. 8A, the forged blank 30 with flash is placed between the upper die 11 and the lower die 12.

Next, the upper die 11 and the lower die 12 are moved toward each other. More specifically, the upper die 11I is moved down. Thereby, as shown in FIG. 8B, the upper die 11 and the lower die 12 come into contact with the forged blank 30, and the forged blank 30 is nipped and held between the upper die 11 and the lower die 12.

In the forged crankshaft production method according to the present embodiment, when the forged blank 30 is nipped with the pair of holding dies 10, the first excess portions Aaa and Aba are reduced and deformed by the pair of holding dies 10. For example, the first excess portions Aaa and Aba are crushed by the pair of holding dies 10 or are bent toward the rough journals along the pair of holding dies 10. Thereby, the first excess portions Aaa and Aba are formed into shapes corresponding to the impressions of the pair of holding dies 10 and are caused to bulge toward the rough journals. Consequently, the thicknesses of the side portions Aa' and Ab' of each of the rough arms A in the region near the adjacent rough pin P are increased. Accordingly, in the finished crankshaft, each of the arms A has thick side portions Aa and Ab in a region near the adjacent pin P. In the state shown in FIG. 8B, each part of the forged blank 30 has a shape substantially same as the corresponding part of the finished forged crankshaft. Therefore, in FIG. 8B, each part of the forged blank 30 is denoted by the same reference symbols used for the corresponding part of the finished forged crankshaft. (The same applies to FIG. 9B.)

While the forged blank 30 is kept held by the pair of holding dies 10, the cutting die 20 is moved in the reducing direction. More specifically, the cutting die 20 is moved down. Thereby, as shown in FIG. 8C, the cutting die 20 comes into contact with the flash B of the forged blank 30, and the flash B is cut and removed from the forged blank 30 as shown in FIG. 8D. Consequently, a forged blank 30a with no flash is obtained.

After completion of the downward movement of the cutting die 20, the cutting die 20 is moved up and retracted, and the upper die 11 and the lower die 12 of the pair of holding dies 10 are separated from each other. Then, the forged blank 30a with no flash is taken out.

In the forged blank 30 with flash, as shown in FIG. 8A, each of the rough arms A' has a surface shape in agreement with the bottom surface of the recess after the trimming step in the rough-journal-facing surface, in the region near the adjacent rough pin P', in the area As' inside of the side portions Aa' and Ab'. The surface shape of the inner area As' is kept during the trimming step. Meanwhile, when the forged blank 30 is nipped with the pair of holding dies 10, the side portions Aa' and Ab' in the region near the adjacent rough pin P' are thickened. Consequently, each of the arms A obtains a recess in the journal-facing surface.

The forged crankshaft production method according to the present embodiment allows production of a crankshaft, wherein each of the arms A has thickened side portions Aa and Ab in the region near the adjacent pin P and has a recess in the journal(J)-facing surface. Accordingly, the forged crankshaft production method according to the present embodiment allows production of a forged crankshaft having a reduced weight and assured stiffness.

In the forged crankshaft production method according to the present embodiment, the first excess portions Aaa and Aba are deformed by the pair of holding dies, whereby the thicknesses of the side portions of each rough arm in the region near the adjacent rough pin are increased. In consequence, the recess is formed in the journal(J)-facing surface of the arm A. Thus, any special tool, such as a punch or the like, is not necessary for the deformation of the first excess portions, and the deformation can be carried out in a simple manner by use of the existing equipment.

In the forged crankshaft production method according to the present embodiment, the first excess portions are deformed when the forged blank is nipped with the pair of holding dies 10 in the trimming step, whereby the thicknesses of the side portions of each rough arm in the region near the adjacent rough pin are increased. Therefore, it is not necessary to make any changes to the conventional production process.

The forged crankshaft production method according to the present embodiment is applicable to production of the forged crankshaft having the second exemplary configuration as shown in FIGS. 4A to 4D. In this case, the forged blank with flash preferably has second excess portions Aca and Ada in each of the rough arms incorporating a rough weight as shown in FIGS. 5A to 5C. The second excess portions Aca and Ada protrude respectively from the outer peripheries of the side portions Ac' and Ad' of the rough arm A' in the region near the adjacent rough journal J'.

When the forged blank is nipped with the pair of holding dies in the trimming step, not only are the first excess portions Aaa and Aba deformed by the pair of holding dies, but the second excess portions Aca and Ada provided to each of the rough arms A' incorporating a rough weight shall be also deformed by the pair of holding dies to bulge toward the adjacent rough pin. Thereby, regarding each of the rough arms A' incorporating a rough weight, the thicknesses of the side portions Ac' and Ad' in the region near the adjacent rough journal J' are increased. The deformation of the second excess portions may be performed, for example, by crushing or bending. Consequently, a crankshaft with a more reduced weight and assured stiffness as shown in FIGS. 4A to 4D can be obtained.

The forged crankshaft production method according to the present embodiment is applicable to the forged crankshaft having the third exemplary configuration as shown in FIGS. 6A and 6B. In the forged crankshaft, only some of the arms A incorporate a weight, and the other arms A are unweighted arms which incorporate no weight.

In this case, the forged blank with flash preferably has second excess portions Aca and Ada in each of the unweighted arms A' as shown in FIGS. 7A and 7B. The second excess portions Aca and Ada protrude respectively from the outer peripheries of the side portions Ac' and Ad' of each of the rough unweighted arms A' in the region near the adjacent rough journal J'.

When the forged blank is nipped with the pair of holding dies in the trimming step, not only are the first excess portions Aaa and Aba deformed by the pair of holding dies, but the second excess portions Aca and Ada provided to each of the rough unweighted arms A' shall be also deformed by the pair of holding dies to bulge toward the adjacent rough pin. Thereby, regarding each of the rough unweighted arms A', the thicknesses of the side portions Ac' and Ad' in the region near the adjacent rough journal J' are increased. The deformation of the second excess portions may be performed, for example, by crushing or bending. Consequently, a crankshaft with a more reduced weight and assured stiffness as shown in FIGS. 6A and 6B can be obtained.

According to the present embodiment, the above-described holder may be used in combination with the pair of holding dies in the trimming step. An example of the trimming step in which the holder is used in combination with the pair of holding dies is described with reference to FIGS. 9A to 9D. The states shown in FIGS. 9A to 9D correspond to the states shown in FIGS. 8A to 8D, respectively. The matters already described with reference to FIGS. 8A to 8D may not be described repeatedly.

In the example to be described below, the trimming is applied to a forged blank 30 for the first exemplary configuration shown in FIGS. 3A to 3C. However, the trimming by use of the holder can be applied to other blanks (for example, a forged blank for the second exemplary configuration and a forged blank for the third exemplary configuration).

In this example, a plurality of holders (for example, four holders) 40 are used to hold the lower surface of the flash 40. The drawings to be described below show only a part of the forged blank, and therefore, only two holders 40 are shown in the drawings. The holders 40 are movable up and down.

First, a forged blank 30 with flash and dies are placed. Specifically, the forged blank 30 is placed between the upper die 11 and the lower die 12. At this time, the cutting die 20 is retracted in the upper position. The lower surface of the flash B is held and kept in a stable posture by the holders 40. The holders 40 hold the forged blank 30 such that the flash B is kept in a horizontal posture. In the state shown in FIG. 9A, the forged blank 30 is not in contact with the pair of holding dies 10.

Figure 9A:
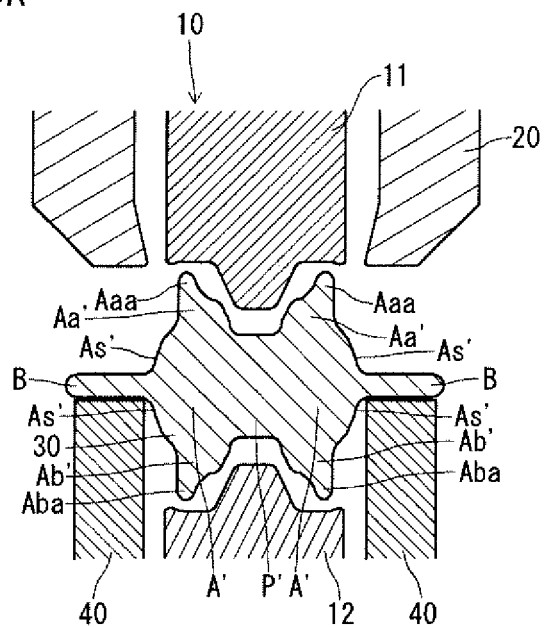
FIG. 9A is a sectional view showing an example of a step in an exemplary process flow of the trimming step according to the present invention.
Figure 9B:
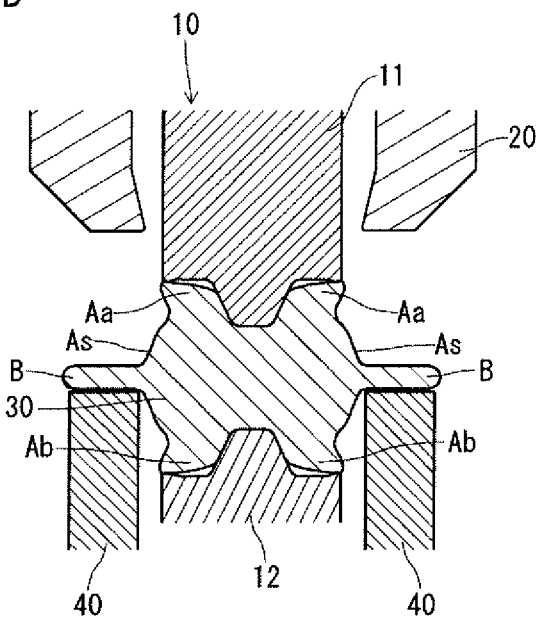
FIG. 9B is a sectional view showing an example of a next step after the step shown in FIG. 9A in the exemplary process flow of the trimming step according to the present invention.

Next, the upper die 11 and the lower die 12 are moved toward each other. Specifically, the upper die 11 is moved down. Thereby, as shown in FIG. 9B, the upper die 11 and the lower die 12 come into contact with the forged blank 30, and the forged blank 30 is nipped and held between the upper die and 11 and the lower die 12.

In the production method according to the present embodiment, as described above, when the forged blank 30 is nipped with the pair of holding dies 10, the first excess portions Aaa and Aba provided to each of the rough arms of the forged die 30 are reduced and deformed. Specifically, the first excess portions are formed into shapes corresponding to the impressions of the holding dies 10 and are caused to bulge toward the rough journal. Consequently, the thicknesses of the side portions Aa' and Ab' of each of the rough arms A' in the region near the adjacent rough pin P' are increased.

In a case where the upper die 11 is moved down to hold the forged blank 30, the upper die 11 first comes into contact with the forged blank 30, and thereafter, the lower die 12 comes into contact with the forged blank 30 along with the downward movement of the forged blank 30. As the upper die 11 is moving further down, the forged blank 30 is deformed. In this case, along with the movement of the pair of holding dies 10 (downward movement of the upper die 11), the flash B moves down. Accordingly, the holders 40 move down along with the downward movement of the flash B while keeping holding the lower surface of the flash B. In other words, the holders 40 moves following the flash B which changes its position along with the movement of the pair of holding dies 10.

The first excess portions Aaa and Aba of the forged blank 30 are deformed by the pair of holding dies 10. Accordingly, at the initial stage of the trimming step, the shapes of the first excess portions Aaa and Aba do not fit in the shapes of the holding dies 10. Therefore, if the forged blank 30 is held by only the lower die 12 without use of the holder 40 at the stage shown in FIG. 9A, the forged blank 30 may be in an unstable posture. The unstable posture of the forged blank 30 will cause unstable performance of the holding dies 10 for holding and shaping and unstable performance of the cutting die 20 for trimming. Hence, it is preferred to use the holder 40 in the trimming step to carry out a stable process.

Figure 9C:
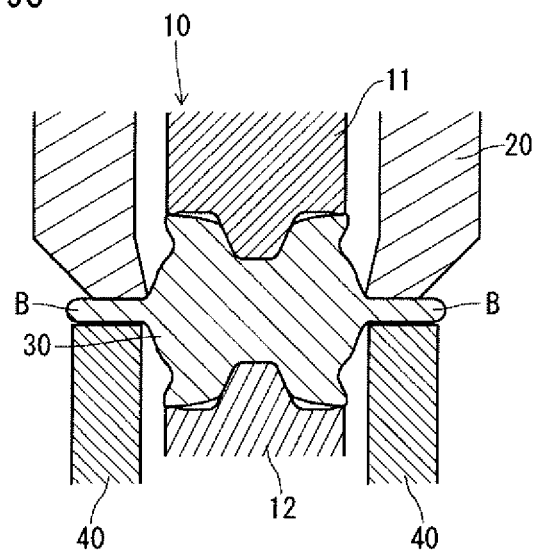
FIG. 9C is a sectional view showing an example of a next step after the step shown in FIG. 9B in the exemplary process flow of the trimming step according to the present invention.
Figure 9D:
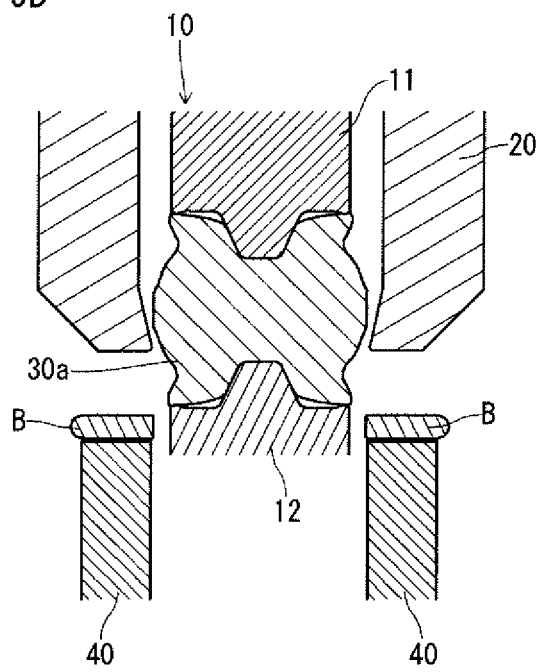
FIG. 9D is a sectional view showing an example of a next step after the step shown in FIG. 9C in the exemplary process flow of the trimming step according to the present invention.

Next, the cutting die 20 is moved down while the forged blank 30 is held by the pair of holding dies 10. Then, the cutting die 20 first comes into contact with the flash B as shown in FIG. 9C. Thereafter, as shown in FIG. 9D, the flash B is cut and removed from the forged blank 30. In this way, a forged blank 30a with no flash is obtained.

The holders 40 move down along with the downward movement of the flash B. After completion of the deformation of the forged blank 30 by the pair of holding dies 10, the forged blank 30 comes in a stable position and a stable posture. Therefore, after completion of the deformation of the forged blank 30 by the pair of holding dies 10 and before the start of trimming, only the holders 40 may be moved down.

The holders 40 which moved down to the positions shown in FIG. 9D may be kept in the lower positions until a specified time even after the cutting die 20 has moved back in the upper position. For example, until the trimmed forged blank 30a has been taken out from between the upper die 11 and the lower die 12, the holders 40 may be stopped at the lower positions. There is no limit as to the mechanism to stop the holders 40 at the lower position, and a conventional mechanism may be used.

After the cutting die 20 is moved down, the cutting die 20 is retracted to the upper position, and the upper die 11 and the lower die 12 of the holding dies 10 are separated from each other. Then, the forged blank with no flash 30a is taken out.

Figure 10:
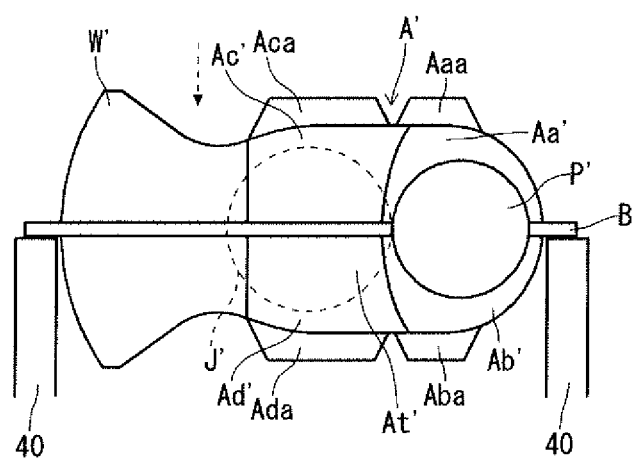
FIG. 10 is a view showing an exemplary holder arrangement in the trimming step according to the present invention.

An example of the trimming step in which the holder 40 is used for trimming of a forged blank 30 for the first exemplary configuration has been described with reference to FIGS. 9A to 9D. The trimming may be applied to other forged blanks 30 in the same manner. FIG. 10 shows an exemplary holder arrangement when a forged blank 30 for the second exemplary configuration is to be trimmed by use of the holder 40. The state shown in FIG. 10 corresponds to the state shown in FIG. 9A.

When a forged blank 30 for the second exemplary configuration is to be trimmed, first, the forged blank 30 with flash is held by the holder 40 as shown in FIG. 10. The lower surface of the forged blank 30 is held by a plurality of holders 40. Thereafter, trimming is performed following the steps shown in FIGS. 9B to 9D. In this way, the forged blank 30 for the second exemplary configuration is trimmed by use of the holders 40. It is possible to trim a forged blank 30 for the third exemplary configuration in the same manner.

In either of the crankshafts having the first, the second and the third configurations, all of the arms, whether incorporating a weight or not, have a recess in the journal-facing surface, in a region near the adjacent pin. In a crankshaft to be produced by the crankshaft production method according to the present embodiment, some of the arms may have a recess in the journal-facing surface, in a region near the adjacent pin. In other words, all or some of the rough arms of a forged blank have first excess portions. Which of the rough arms are to be provided with the first excess portions shall be determined as appropriate according to the bending stiffness and the torsional stiffness required in each arm of the crankshaft and in what portions the crankshaft is required to have high stiffness.

As described above, an arm incorporating a weight (which will be referred to as a "weighted arm") preferably has a recess in the pin-facing surface, in a region near the adjacent journal. In a crankshaft including a plurality of weighted arms, all of the weighted arms may have a recess in the pin-facing surface, in a region near the adjacent journal. Alternatively, some of the weighted arms may have a recess in the pin-facing surface. In other words, all or some of the rough weighted arms of a rough forged blank may have second excess portions. Which of the rough arms are to be provided with the second excess portions shall be determined as appropriate according to the bending stiffness and the torsional stiffness required in each arm of the crankshaft and in what portions the crankshaft is required to have high stiffness.

As described above, an unweighted arm preferably has a recess in the pin-facing surface, in a region near the adjacent journal. In a crankshaft including a plurality of unweighted arms, all of the unweighted arms may have a recess in the pin-facing surface, in a region near the adjacent journal. Alternatively, some of the unweighted arms may have a recess in the pin-facing surface. In other words, all or some of the rough unweighted arms of a rough forged blank may have second excess portions. Which of the rough arms are to be provided with the second excess portions shall be determined as appropriate according to the bending stiffness and the torsional stiffness required in each arm of the crankshaft and in what portions the crankshaft is required to have high stiffness.

The rough arm may have first excess portions on both sides in the region near the adjacent rough pin as has been described in connection with the first to the third exemplary configurations, or alternatively, the rough arm may have a first excess portion only on one side in the region near the adjacent rough pin. Even in a case where the rough arm has a first excess portion only on one side in the region near the adjacent rough pin, the trimming step to cause the first excess portion to bulge toward the rough journal provides an increase in the thickness of the side portion. This ensures stiffness while reducing the weight. Which side of the rough arm is to be provided with the first excess portion shall be determined as appropriate according to the bending stiffness and the torsional stiffness required in the arm and in what portion the arm is required to have high stiffness.

As has been described in connection with the second exemplary configuration, the rough weighted arm may have second excess portions on both sides in the region near the adjacent rough journal. Alternatively, the rough weighted arm may have a second excess portion on only one side in the region near the rough journal. Even in a case where the rough arm has a second excess portion only on one side in the region near the adjacent rough pin, the trimming step to cause the second excess portion to bulge toward the rough pin provides an increase in the thickness of the side portion. This ensures stiffness while reducing the weight. Which side of the rough arm is to be provided with the second excess portion shall be determined as appropriate according to the bending stiffness and the torsional stiffness required in the arm and in what portion the arm is required to have high stiffness.

As has been described in connection with the third exemplary configuration, the rough unweighted arm may have second excess portions on both sides in the region near the adjacent rough journal. Alternatively, the rough unweighted arm may have a second excess portion on only one side in the region near the rough journal. Even in a case where the rough arm has a second excess portion only on one side in the region near the adjacent rough pin, the trimming step to cause the second excess portion to bulge toward the rough pin provides an increase in the thickness of the side portion. This ensures stiffness while reducing the weight. Which side of the rough arm is to be provided with the second excess portion shall be determined as appropriate according to the bending stiffness and the torsional stiffness required in the arm and in what portion the arm is required to have high stiffness.

INDUSTRIAL APPLICABILITY

The present invention is efficiently utilized in a method for producing a forged crankshaft to be mounted in a reciprocating engine.

LIST OF REFERENCE SYMBOLS

1: forged crankshaft
J, J1 to J5: journal

P, P1 to P4: pin
Fr: front part
Fl: flange
A, A1 to A8: crank arm
W, W1 to W8: counterweight
J': rough journal
P': rough pin
A': rough crank arm
W': rough counterweight
Aa, Ab: side portion of an arm in a region near a pin
Aa', Ab': side portion of a rough arm in a region near a rough pin
Aaa, Aba: first excess portion
Ac, Ad: side portion of an arm in a region near a journal
Ac', Ad': side portion of a rough arm in a region near a rough journal
Aca, Ada: second excess portion
As: inner area of a journal-facing surface of an arm, inside of side portions
As': inner area of a rough-journal-facing surface of a rough arm, inside of side portions
At: inner area of a pin-facing surface of an arm, inside of side portions
At': inner area of a rough-pin-facing surface of a rough arm, inside of side portions
B: flash
10: pair of holding dies
11: upper die
12: lower die
20: cutting die
30, 30a: forged blank
40: holder

The invention claimed is:

1. A method for producing a forged crankshaft including journals serving as a center of rotation, pins decentered from the journals, and crank arms connecting the journals and the pins, wherein
the forged crankshaft further includes counterweights integrated with all or some of the crank arms,
the method comprising:
a die forging step of obtaining a forged blank with flash having a crankshaft shape; and
a trimming step of removing the flash from the forged blank while nipping the forged blank with a pair of holding dies, wherein:
the forged blank includes rough journals, rough pins, rough crank arms, and rough counterweights, which correspond to the journals, the pins, the crank arms, and the counterweights of the forged crankshaft, respectively;
at least one of the rough crank arms has, in a region near an adjacent one of the rough pins, a first excess portion protruding from an outer periphery of a side portion of the rough crank arm; and
when the forged blank is nipped with the pair of holding dies in the trimming step, the first excess portion is deformed by the pair of holding dies to bulge toward an adjacent one of the rough journals.

2. The method for producing a forged crankshaft according to claim 1, wherein
the rough crank arm has, in the region near the adjacent rough pin, first excess portions respectively protruding from outer peripheries of two side portions of the rough crank arm.

3. The method for producing a forged crankshaft according to claim 2, wherein
in the trimming step, the first excess portion is deformed by the pair of holding dies to bulge toward the adjacent rough journal while a holder is holding a lower surface of the flash; and
the holder moves along with a movement of the pair holding dies while keeping holding the lower surface of the flash.

4. The method for producing a forged crankshaft according to claim 3, wherein
at least one of the rough crank arms has, in a region near an adjacent one of the rough journals, a second excess portion protruding from an outer periphery of a side portion of the rough crank arm; and
when the forged blank is nipped with the pair of holding dies in the trimming step, the second excess portion is deformed by the pair of holding dies to bulge toward the adjacent rough pin.

5. The method for producing a forged crankshaft according to claim 4, wherein
the rough crank arm has, in the region near the adjacent rough journal, second excess portions respectively protruding from outer peripheries of two side portions of the rough crank arm.

6. The method for producing a forged crankshaft according to claim 2, wherein
at least one of the rough crank arms has, in a region near an adjacent one of the rough journals, a second excess portion protruding from an outer periphery of a side portion of the rough crank arm; and
when the forged blank is nipped with the pair of holding dies in the trimming step, the second excess portion is deformed by the pair of holding dies to bulge toward the adjacent rough pin.

7. The method for producing a forged crankshaft according to claim 6, wherein
the rough crank arm has, in the region near the adjacent rough journal, second excess portions respectively protruding from outer peripheries of two side portions of the rough crank arm.

8. The method for producing a forged crankshaft according to claim 1, wherein
in the trimming step, the first excess portion is deformed by the pair of holding dies to bulge toward the adjacent rough journal while a holder is holding a lower surface of the flash; and
the holder moves along with a movement of the pair holding dies while keeping holding the lower surface of the flash.

9. The method for producing a forged crankshaft according to claim 8, wherein
at least one of the rough crank arms has, in a region near an adjacent one of the rough journals, a second excess portion protruding from an outer periphery of a side portion of the rough crank arm; and
when the forged blank is nipped with the pair of holding dies in the trimming step, the second excess portion is deformed by the pair of holding dies to bulge toward the adjacent rough pin.

10. The method for producing a forged crankshaft according to claim 9, wherein
the rough crank arm has, in the region near the adjacent rough journal, second excess portions respectively protruding from outer peripheries of two side portions of the rough crank arm.

11. The method for producing a forged crankshaft according to claim 1, wherein in the trimming step, the first excess portion is deformed by crushing or bending.

12. The method for producing a forged crankshaft according to claim 11, wherein
at least one of the rough crank arms has, in a region near an adjacent one of the rough journals, a second excess portion protruding from an outer periphery of a side portion of the rough crank arm; and
when the forged blank is nipped with the pair of holding dies in the trimming step, the second excess portion is deformed by the pair of holding dies to bulge toward the adjacent rough pin.

13. The method for producing a forged crankshaft according to claim 12, wherein
the rough crank arm has, in the region near the adjacent rough journal, second excess portions respectively protruding from-outer peripheries of two side portions of the rough crank arm.

14. The method for producing a forged crankshaft according to claim 1, wherein
at least one of the rough crank arms has, in a region near an adjacent one of the rough journals, a second excess portion protruding from an outer periphery of a side portion of the rough crank arm; and
when the forged blank is nipped with the pair of holding dies in the trimming step, the second excess portion is deformed by the pair of holding dies to bulge toward the adjacent rough pin.

15. The method for producing a forged crankshaft according to claim 14, wherein
the rough crank arm has, in the region near the adjacent rough journal, second excess portions respectively protruding from outer peripheries of two side portions of the rough crank arm.

16. The method for producing a forged crankshaft according to claim 14, wherein
the rough crank arm having the second excess portion is the rough crank arm incorporating a rough counterweight.

17. The method for producing a forged crankshaft according to claim 14, wherein
the rough crank arm having the second excess portion is the rough crank arm not incorporating a rough counterweight.

18. The method for producing a forged crankshaft according to claim 14, wherein
in the trimming step, the second excess portion is deformed by crushing or bending.

* * * * *